United States Patent [19]

Chevallereau

[11] 3,719,965
[45] March 13, 1973

[54] METHOD OF MAKING FOOTWEAR SOLES

[75] Inventor: Jacques Chevallereau, Juvisy Sur Orge, France

[73] Assignee: Ets Parttzky S.A., Mauleon-Soule, France

[22] Filed: April 13, 1971

[21] Appl. No.: 133,628

[30] Foreign Application Priority Data

April 20, 1970 France..................................7014152

[52] U.S. Cl..................................12/146 B, 36/32 R
[51] Int. Cl. ..................................A43d, A43b 13/04
[58] Field of Search .......36/11.5, 25 R, 28, 29, 32 R; 36/3 B; 12/146 B

[56] References Cited

UNITED STATES PATENTS

| 2,983,056 | 5/1961 | Murgwski | 36/32 R |
| 2,928,192 | 3/1960 | Green | 36/32 R |
| 2,100,492 | 11/1937 | Sindler | 36/29 |
| 3,129,520 | 4/1964 | Funck | 36/28 |

Primary Examiner—Patrick D. Lawson
Attorney—Brenner, O'Brien, Guay & Connors

[57] ABSTRACT

A method of making soles for shoes wherein the soles are cut from extruded material in strip form having a plurality of integrated cylinders extinding transversely of the strip. A relatively thick heel portion is extruded as part of the strip.

3 Claims, 3 Drawing Figures

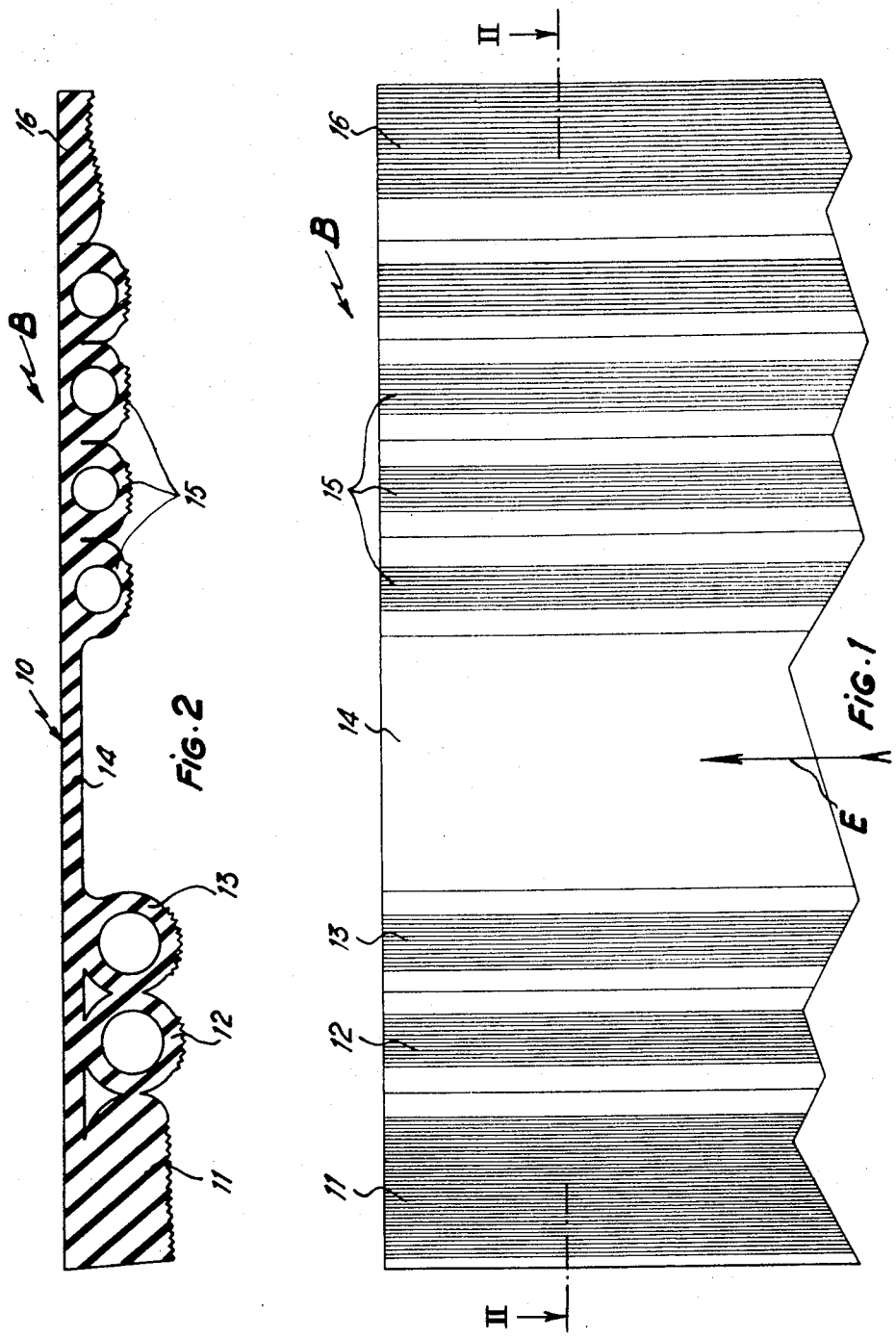

METHOD OF MAKING FOOTWEAR SOLES

This invention relates to footwear, and particularly to footwear soles of synthetic material, and to processes for making such soles.

Soles of synthetic material, especially those of synthetic rubber, have been known for a long time. According to most current manufacturing techniques each sole is moulded individually. A more rudimentary technique also exists, in which soles of synthetic material are made by cutting them out of a sheet of practically uniform thickness.

It has also been suggested for some time to provide cavities in soles of synthetic material, with the essential object of giving them greater flexibility, in particular in the portion corresponding to the sole of the foot, and to give greater comfort to the wearer. It is traditional to provide ribs or other relieving on the portion of the sole which rests upon the ground with the essential object of producing a non-skid sole.

In accordance with the invention, a footwear sole is made from a single piece of synthetic material and includes a number of cylindrical, transversal tubular elements extending from one side of the sole to the other.

The word "cylindrical" as used herein is to be understood in its widest sense as meaning a surface generated by a straight line, the so-called generatrix, which moves, always remaining parallel to itself, in any curve whatever, the so-called guiding curve. Thus, the tubular elements in accordance with the invention can have any section, as for example that of a circle, an ellipse, a polygon or a curved polygon.

Experience has shown that such tubular elements may be used very advantageously to bestow upon the sole truly remarkable flexibility qualities. In particular, such a sole presents excellent anti-vibratory properties, which renders it particularly appropriate for working and safety boots. Furthermore, the arrangement of the tubular elements, which are provided advantageously with ribs, gives it also improved non-skid properties.

The soles in accordance with the invention are preferably made by extrusion of a strip of synthetic material including, parallel to the axis of extrusion, a number of the tubular elements, this strip being subsequently cut out, as by means of the hollow punch, to produce individual soles, the length of the soles being in the direction of the width of the strip.

The invention will be more readily understood by way of example from the following description of a footwear sole in accordance therewith, reference being made to the accompanying drawings in which:

FIG. 1 shows the extruded strip as viewed from underneath,

FIG. 2 is a section on the line II—II of FIG. 1, i.e. perpendicularly to the axis of extrusion.

Figure 3:
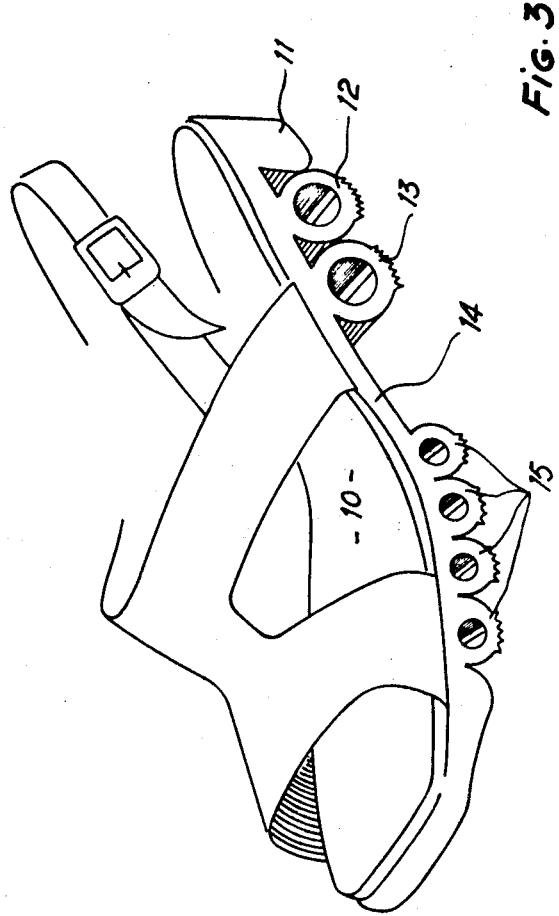
FIG. 3 shows a shoe incorporating a sole made by cutting out from the strip of FIGS. 1 and 2.

The sole is preferably made of synthetic rubber, but more generally it may be made from any material capable of being extruded whilst possessing the mechanical qualities which render it suitable to form a sole.

FIGS. 1 and 2 show the extruded strip from which the shoes are made. As can be seen in FIG. 2, this strip presents in section a profile which has the general shape of a sole with a planar upper surface 10. On the underside, the sole is formed with an extra thickness 11 which, with two tubular elements 12 and 13 constitutes a heel. In the central portion, there is a slender bridging zone 14. At the other side, there are a number of tubular elements 15 and a slender end zone 16. All the tubular elements 12, 13 and 15 extend parallel to the direction of extrusion E. Preferably, as shown, all the elements are provided on their face opposite the surface 10, with small auxiliary non-skid ribs.

The sole is shown in FIG. 3 with the shoe in which it is incorporated. The sole is obtained by cutting it out of the extruded strip B, the length of the sole being in the direction of the width of the strip and the central axis of the sole therefore being practically perpendicular to the direction of extrusion.

It will be understood that the sole represented in FIG. 3 is only one example among the very numerous possible variants and that, moreover, this sole, as represented, also presents a certain number of characteristics of an aesthetic nature which do not form part of the invention.

The new structure of sole presents excellent anti-vibratory properties. It is by virtue of this fact particularly suitable for use in working boots, and notably in special footwear for those working in environments subjected to numerous industrial vibrations, for example personnel working on airport runways or building workers who are in charge of pneumatic drilling machines.

The transversal arrangement of the tubular elements is then also particularly advantageous. It may be mentioned that these tubular elements may be utilized for joining in a simple manner the upper part of the shoe to the sole, for example by passing thin straps through them.

It will be noted that the new structure and the extrusion process for its manufacture are practically inseparable, the extrusion, never before used for making soles, being the only technique which allows at the present time readily to obtain the new sole structure.

I claim:

1. A method of making footwear soles, said soles including transverse cylindrical elements extending from one side of each sole to the other, comprising the steps of extruding a long unitary sole-strip having a section substantially corresponding to the desired sole profile and including a plurality of integrated cylinders extending in the extrusion direction, and cutting the soles from said strip in such a way said cylinders are out transversally to form said sole transverse cylindrical elements.

2. A method according to claim 1 wherein a relatively thick heel element is extruded with the other parts of the sole.

3. A method according to claim 1 wherein said cylindrical elements are tubular in form.

* * * * *